United States Patent [19]

Siebeneiker et al.

[11] Patent Number: 4,563,931
[45] Date of Patent: Jan. 14, 1986

[54] SYSTEM FOR SCANNING MECHANICAL VIBRATIONS

[75] Inventors: Günter Siebeneiker, Wetter; Hartmut Brunn, Sprockhövel; Uwe Steiger, Witten, all of Fed. Rep. of Germany

[73] Assignee: Kromberg & Schubert, Wuppertal, Fed. Rep. of Germany

[21] Appl. No.: 554,833

[22] Filed: Nov. 23, 1983

[30] Foreign Application Priority Data

Nov. 25, 1982 [DE] Fed. Rep. of Germany ....... 3243563

[51] Int. Cl.[4] .............................................. G10H 3/18
[52] U.S. Cl. ...................................... 84/1.16; 84/1.18; 73/651
[58] Field of Search ................... 84/1.16, 1.18; 73/651, 73/653, 655

[56] References Cited

U.S. PATENT DOCUMENTS

| 3,038,363 | 6/1962 | Miessner | 84/1.18 X |
|---|---|---|---|
| 3,604,940 | 9/1971 | Matthews | 73/655 X |
| 3,733,953 | 5/1973 | Ferber | 84/1.16 |
| 4,028,977 | 6/1977 | Ryeczek | 84/1.16 |
| 4,321,463 | 3/1982 | Stecher | 84/1.18 X |
| 4,429,607 | 2/1984 | Meno | 84/1.18 |
| 4,442,750 | 4/1984 | Bowley | 84/1.18 |

FOREIGN PATENT DOCUMENTS 2916684 11/1980 Fed. Rep. of Germany .

*Primary Examiner*—Stanley J. Witkowski
*Attorney, Agent, or Firm*—Michael J. Striker

[57] ABSTRACT

A system for scanning vibrations of a mass and for converting the mechanical vibrations into corresponding electrical signals is disclosed. The system includes a source of a scanning radiation beam, preferably of a light beam, which has a larger transverse cross section than the vibrating mass. The umbra behind the mass and the surrounding illuminated area are collected by a focussing lens and projected onto an optoelectric converter. The collecting surface and/or the active light receiving surface of the converter have an outline which is variable in the direction of displacement of the vibrating mass so that the illuminated area varies in size during the vibration of the mass.

17 Claims, 11 Drawing Figures

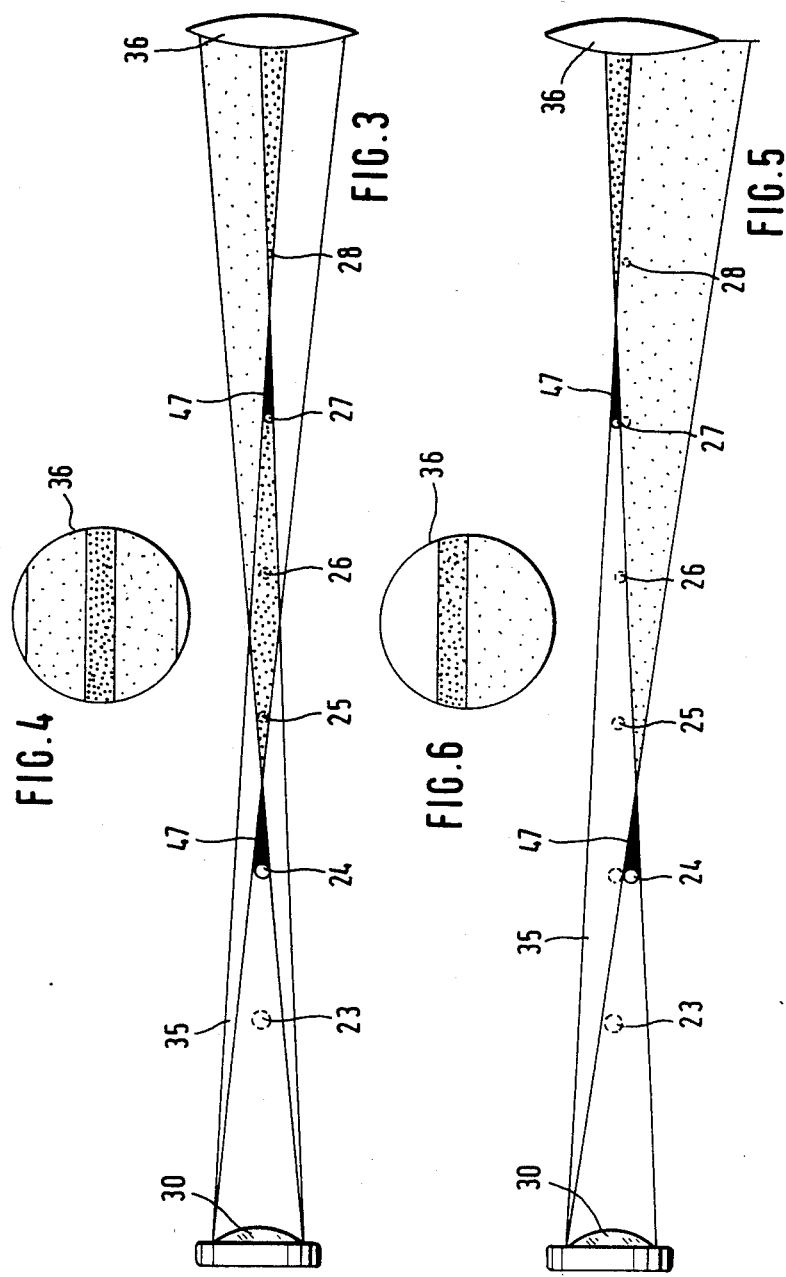

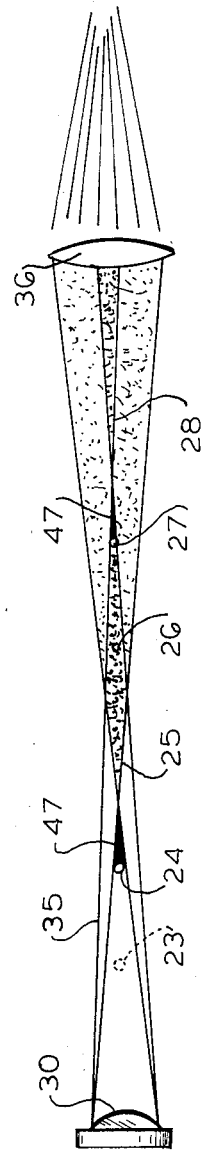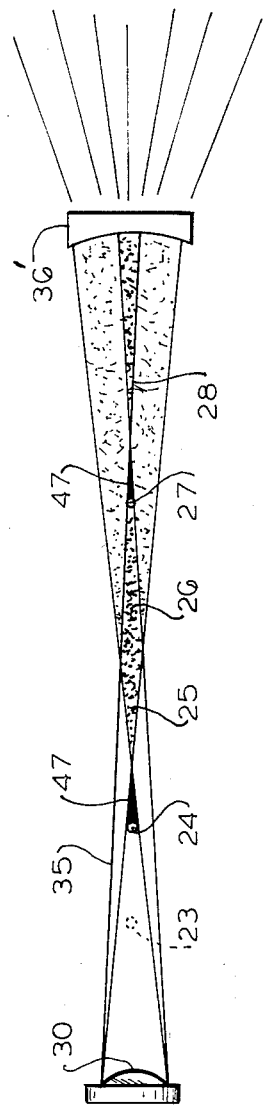

SYSTEM FOR SCANNING MECHANICAL VIBRATIONS

BACKGROUND OF THE INVENTION

The invention relates in general to a system for scanning vibrations of a mass, and for converting such mechanical vibrations, particularly of strings of musical instruments such as guitars, harps, pianos, and the like, into corresponding alternating electrical signals.

In a scanning system of this kind disclosed in German DE-OS 29 16 684, a part of the vibrating body is arranged in the path of a light beam and cooperates with a stationary body in such a manner that a gap is created between the vibrating and stationary bodies. This gap is variable in accordance with the vibrations of one of these bodies, so that, depending on the amplitude of the vibrations broad or a narrow strip is illuminated on the active surface of a converter. According to the size of the activated surface of the converter the corresponding voltage signals are generated. This known scanning system, however, permits only the scanning of such mechanical vibrations whose amplitudes are directed to the stationary body. Vibrations occurring in another plane oriented in the longitudinal direction of the gap between the vibrating and stationary bodies can be detected only by using two converters with two light gaps arranged at right angles one to another. Even in this arrangement it is possible to scan vibrations in respective planes only, whereas scanning of vibrations in longitudinal direction of the light beam is not possible.

SUMMARY OF THE INVENTION

It is therefore a general object of the present invention to overcome the aforementioned disadvantages.

More particularly, it is an object of the invention to provide an improved vibration scanning system which is not possessed of these disadvantages.

An additional object of the invention is to provide such an improved scanning system which permits the conversion of mechanical vibrations in the longitudinal direction of the scanning light beam.

In keeping with these objects and others which will become apparent hereafter, one feature of the invention resides, in a vibration scanning system of the aforedescribed kind, in a combination which comprises means for directing a narrow radiation beam against the path of the vibrating mass whose cross section is less than the cross section fo the beam, and the part of the active surface of the converter which is arranged in the path of the beam behind the vibrating mass part has such a configuration that, due to the lateral displacement of the umbra of the vibrating part, the illuminated portion of the active surface varies in size. Due to the smaller cross section of the vibrating mass part with respect to the cross section of the scanning radiation beam, the amplitudes of vibrations in a plane oriented in the longitudinal direction of the radiation beam produce on the active surface of the converter an umbra which periodically changes its size, so that even this vibrating mode is detectable. In another vibrating mode, when the mass part vibrates at right angles to the longitudinal direction of propagation of the radiation beam, there occurs always a lateral displacement of the umbra on the active surface of the converter, and these vibrations can be reliably detected.

The active surface of the converter exposed to the radiation beam may have a circular configuration. In this simple manner, it is achieved that, when the umbra of the vibrating mass part is displaced laterally to the circular rim of the active surface, it is reduced in size and consequently the proportion of the active surface exposed to the radiation becomes larger in size. As a consequence, due to this lateral displacement of the umbra, a corresponding variation of the voltage at the output of the converter is generated.

In a variation, the ray beam impinging on the active surface of the converter may also have a circular cross section. In this manner it is also achieved in a simple way that a lateral displacement of the vibrating body a smaller part of the active surface is shaded off, while the exposed active area becomes proportionally larger and so is the signal at the output of the converter.

In the plane of propagation of the ray beam, it is possible to arrange one after the other a plurality of vibrating bodies whose cross sections fall below the cross section of the radiation beam. The umbras of respective vibrating bodies superpose each other on a common active surface of the converter. Nevertheless, the superposed umbras generate a compound alternating voltage during the vibration of individual bodies.

With advantage an optical system can be arranged between the converter and the vibrating mass part for focussing the illuminating radiation beam to a smaller cross-sectional area. This optical device can be in the form of a collecting lens. In this manner it is possible to use a relatively small illumination surface at the side of the converter, whereas the radiation source can transmit a ray beam towards the converter which in the range of the vibrating mass part may have a substantially larger cross-sectional area. In addition, it is also advantageous when the collecting lens has a circular periphery, so that the ray beam projected on the active area of the converter has a circular cross section.

If desired, it is also possible to arrange between the converter and the vibrating mass part an optical device, preferably in the form of a diverging lens which disperses the ray beam on a larger cross-sectional area of the active surface. In this manner, it is possible to scan with a very narrow beam to detect very small vibrational amplitudes. By dispersing the ray beam on a larger cross-sectional area, the displacement of the umbra on the active surface of the converter is magnified.

In another embodiment, a radiation conduit, preferably in the form of a flexible light-conducting fiber can be arranged between the active surface of the converter and the optical device for transforming the cross-sectional area of the ray beam. In this way it is achieved that the optoelectric converter need not be arranged immediately behind the device for transforming the cross section of the radiation beam. The provision of light conduits makes it possible that the converter can be located outside interfering electromagnetic fields.

The electrical signal at the output of the converter can be processed in a transformer into an effective signal which may be applied to a pneumatic or the like control member.

When the system of this invention is used in connection with musical instruments, the output signal from the converter is amplified in an amplifier, and converted in a speaker into an acoustic signal.

The converted electrical signals from the output of the converter, after amplification and conversion in at least one speaker into audible signals, reproduce the sounds of strings of a guitar, of a harp, of a piano, and the like.

In scanning the vibrations of strings of the above musical instruments the radiation beam is directed at right angles to the strings which are arranged in one plane one after the other. The scanning system of this invention picks up in simple manner the vibrations of all consecutive strings.

In one embodiment of this invention, the radiation source is a light source in the form of an incandescent lamp provided with means for directing a light beam against the vibrating mass parts.

Preferably, the light source is connected to adjusting means which adjust the light beam symmetrically relative to the plane of the consecutive strings. Preferably, the light beam is enclosed in a U-shaped cover provided with openings for individual strings, so that the light beam and the focussing optical system with the series-connected converter is protected against ambient light, so that the latter cannot produce any interference.

The novel features which are considered characterisitic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a schematic representation of a scanning light beam emanating from a light source and directed in a plane of a set of guitar strings against a converging lens;

FIG. 4 shows in a front view the collecting lens with partially shaded off areas of the light beam behind the strings;

FIG. 5 is an illustration corresponding to FIG. 3, with strings vibrating transversely to the direction of propogation of the light beam;

FIG. 6 is a view of the collecting lens of FIG. 4 with a laterally displaced shaded off area of the light beam behind the vibrating strings;

FIG. 9 is an illustration similar to FIG. 7 but in which two strings have different amplitudes in the vibration plane parallel to the direction of propagation of the light beam;

FIG. 11 shows a modification of FIG. 9 in which the collecting lens is replaced by a dispersing lens.

DESCRIPTION OF THE PREFERRED EMBODIMENTS

Figure 1:
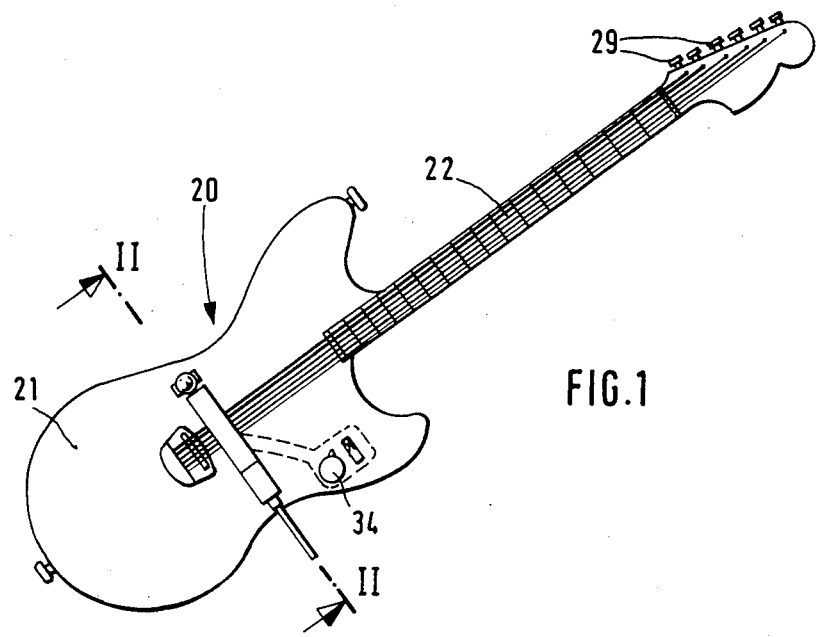
FIG. 1 is a top view of a guitar provided with the vibration scanning system of this invention.

The scanning system of this invention is illustrated in connection with a guitar 20 consisting of a guitar body 21, a fretted neck 22 and strings 23-28 each secured at one end to the guitar body by non-illustrated catches and extending over the neck to screw-type pegs 29 by means of which the strings are tuned (FIG. 1). The scanning system of this invention is attached to the guitar body 21 above the strings and serves for scanning the vibrations of the strings and converting the same into amplified audible signals.

Figure 2:
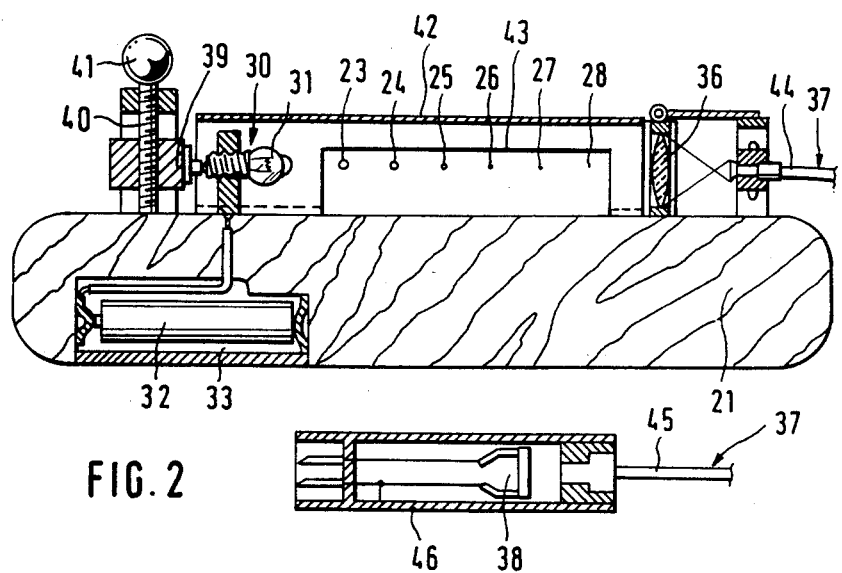
FIG. 2 is a sectional side view taken along the line II—II of the guitar of FIG. 1, shown on an enlarged scale.

Referring now to FIG. 2, it will be seen that the scanning system consists of a radiation source, in this example in the form of a light source 30 constituted for example by an incandescent lamp 31. The lamp 31 is energized from a battery 32 which may be located in a recess 33 in the lower side of the guitar body 21. The current supply conduits from the battery to the incandescent lamp are connected via a switch 34 located on the upper surface of the guitar body to switch on or off the operation of the system.

A radiation beam, namely the light beam 35 emanating from the light source 30, is directed against a converging or focussing lens 36 (FIGS. 3-10). The centers of the light source 30 of the lens 36 are arranged in the plane of the set of strings 23-28 at opposite sides of the latter. The diameter of the light source 30 is larger than the diameters of respective strings, and consequently a converging umbra is formed behind each of the strings. Due to the consecutive arrangement of the strings in one plane, the umbras of respective strings combine with each other and project a single shaded off strip on the collecting lens 36.

In playing the guitar 20 one or more strings 23-28 are brought to vibration, and consequently the umbra of the vibrating string is projected on the collecting lens 36 as a shaded off strap vibrating at the same frequency. As a consequence, the illuminated area of the light collecting lens 36 varies complementary to the increasing and decreasing breadth of the shaded off strap.

It will be seen from FIG. 2 that the focussing lens 36 projects the incoming light pattern on a relatively small cross-sectional area at the end face of a light guide 37. The light guide 37 is in the form of a light-conducting fiber by means of which the light focussed by the lens 36 is supplied to an optoelectric converter 38, which converts the light into corresponding alternating electrical voltage. Of course, it is also possible to pick up the light projected by the focussing lens 36 directly to the optoelectric converter 38. In the latter case, however, the minute voltages at the output of the converter must be amplified in a non-illustrated amplifier, whereby the electrical conduits are exposed to electromagnetic fields which may introduce interference in the useful signal. On the other hand, in using ight conduits the picked-up light signals are not susceptible to interference and can be fed to a remote electro-optical converter which in this case is arranged in close proximity to the electric amplifier. The amplifier is further connected to a non-illustrated loudspeaker system which converts the amplified electrical signal into useful acoustic signals corresponding to the vibrations of strings 23-28.

It will be seen from FIG. 2 that the lamp 31 is mounted on a holder 39 which is adjustable at right angles to the plane of strings 23-28 by an adjustment screw 40. By rotating the actuation knob 41 of the screw 40 the vertical position of the lamp 31 relative to the string is changed, and consequently the symmetry of the light beam 35 relative to the plane of the strings 23-28 is adjustable.

The scanning light beam 35 transmitted from the light source past the strings 23-28 against a collecting lens 36 is enclosed in a cover 42 provided with openings 43 for respective strings. The cover 42 protects the scanning system against ambient light which might fall on the collecting lens and interfere with the scanning process.

For the sake of simplicity, only the end portions 44 and 45 of the light conduit 37 are illustrated in FIG. 2. As explained before, the input end 44 of the light conduit 37 is located immediately behind focus point of the lens 36, whereas the output end 45 is connected to a plug 46 in which an electro-optical converter 38 is enclosed. The connector plug 46 is adapted for being directly connected to a non-illustrated electric amplifier.

As has been explained before, the scanning system of this invention uses a scanning light beam which is directed parallel to the plane of consecutively arranged strings of a guitar, for example, so that the umbras of respective strings overlap each other. Surprisingly, it has been found that the superposed umbras in the path of propagation of the light beam 35 are sufficient to produce modulated voltages in the optoelectric converter, which upon amplification and reproduction in a loudspeaker produce clear and pure tones of individual guitar strings 23-28.

The reason for this phenomenon might be the fact that each guitar string 23-28 casts its own umbra. In FIGS. 3 and 4, this is illustrated with reference to strings 24 and 27. Immediately behind the guitar string 24 an umbra 47 is cast devoid of any light from the light source 30. However, due to the diameter difference between the light source and the string, the umbra is relatively short and does not reach the focussing lens 36. Nevertheless, half shaded regions are generated besides and behind the umbra 47 which are not illuminated by the full radiating surface of the light source 30. The more half shades are superimposed behind the strings 23-28, the darker are these regions at the receiving surface of the converging lens 36.

As seen from FIG. 4, a horizontal dark band extending in the center region of the collecting lens 36 represents the combined half shades of consecutively arranged strings 24 and 27. In this example, the shadows cast by guitar strings 23, 25, 26 and 28 are not considered. Below and under the central dark, horizontal band, there are produced additional bands which are somewhat brighter and result from the combined half shades.

FIG. 5 illustrates by a full line the guitar string 24 in a position in which it is displaced in vertical direction relative to its neutral position. The shaded off areas formed on the surface of the collecting lens 36 produce a different pattern having different brightness values. Due to the displacement of the dark band towards the curved rim of the lens, larger areas of the lens are illuminated and the converter 38 produces higher voltage. These voltage differences correspond exactly to the frequency of vibration of the corresponding string.

Figures 7, 8, 10:
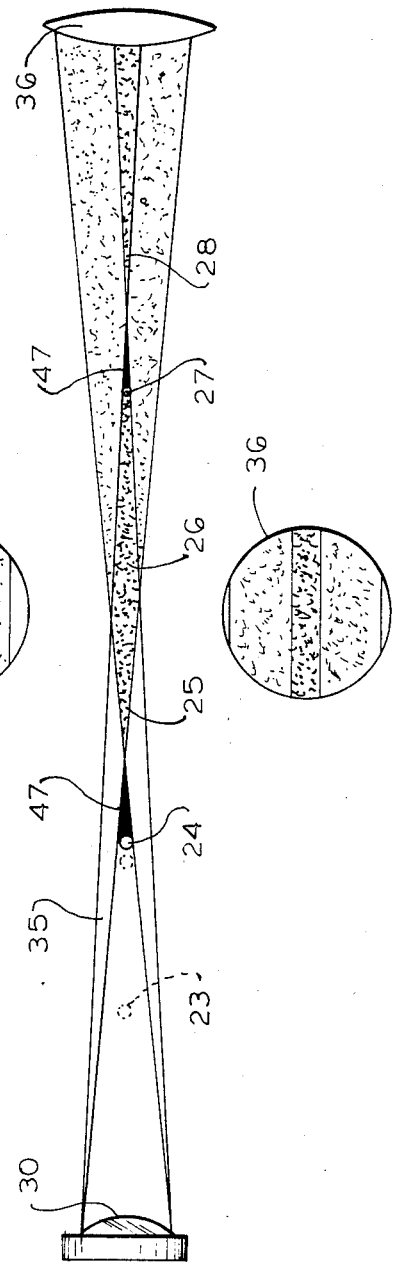
FIG. 7 is an illustration corresponding to FIG. 3 in which the strings vibrate in a plane coinciding with the direction of propagation of the light beam.
FIG. 8 is a view of the collecting lens similar to FIG. 4 showing the shaded off area or umbra of a string in one momentary position of its parallel vibrations.
FIG. 10 is a front view of the collecting lens similar to FIG. 8, showing the changed umbra of the vibrating strings.

From FIGS. 4 and 6, it is evident that, by vibrating the strings 24 and 27 transversely to the direction of propagation of the light beam, the dark bands projected on the collecting lens 36 are periodically shifted to the upper and lower sides of the lens. Due to the circular shape of the lens, there are produced differences in the illumination of the collecting lens and hence of the active surface of the converter without changing the width of the dark bands. More specifically, the dark band illustrated in FIG. 6 occupies a smaller area of the total surface of the collecting lens 36 than the equally wide dark band projected across the center region of the circular collecting lens. The more remote is the shaded off band from its center position, the more it is reduced in size by the converging rounded rim of the lens when viewed in the direction of movement of the band, and the higher voltages are converted due to the increased illumination of the active surface of the converter. According to further feature of the scanning system of this invention, the scanning action is not impaired even if the strings 23-28 do not vibrate at right angles to the direction of propagation of the light beam 35. The scanning system of this invention is fully operative even if the strings vibrate fully or partially in the direction of propagation of the beam, that is in the common plane of the string set. This feature is explained in more detail with reference to FIGS. 5-10. In FIG. 7, the strings 24 and 27 are illustrated by full lines in a vibrational position in which the amplitude of the string is directed away from the rest position of the string in the direction of propagation of the light beam. In FIG. 9, in contrast, the strings 24 and 27 are illustrated at a moment of their vibrations when their amplitude is directed in the plane of propagation of the light beam towards the light source 30. In this mode of vibrations in which the strings 24 and 27 are displaced parallel to the light beam 35, there result different shaded off areas on the collecting lens which is different from the pattern shown in FIG. 3. The differences in the shade patterns according to FIGS. 3, 7 and 9 result also in correspondingly different voltages at the output of converter 38, producing also after amplification and transformation, different acoustic signals. As seen from FIG. 8, the dark band at the center of the lens 36 is more narrow than the dark band according to FIG. 4. This can be explained from the increased distance of strings 24 and 27 from the light source 30 (FIG. 7). The dark band shown in FIG. 10 is broader than that in FIG. 4, because in this case the strings 24 and 27 are displaced closer to the light source 30.

It will be understood that each of the elements described above, or two or more together, may also find a useful application in other types of constructions differing from the types described above.

For instance, the scanning system of this invention is equally applicable for amplifying acoustic oscillations of other string instruments such as harps, pianos and the like. Moreover, the light beam transmitted from the light source can be substituted by other radiation beams, such as an infrared or ultraviolet light beam which is invisible to the eye. Also, laser beams, roentgen beams, and the like, are conceivable. The invention is not limited to scanning of solid materials such as strings of musical instruments. It is also applicable for gaseous or liquid substances provided that they can cast shadows. For scanning vibrations of very small amplitudes, the scanning radiation beam is made very thin, and to magnify the projections on the shaded off areas, a dispersion lens 36, is used to increase the illuminated surface, as shown in FIG. 11. The scanning system of this invention is also applicable for detecting other mechanical vibrations which are beyond the range of audio frequencies. In this case, the vibrations of matter are converted into electrical signals which serve in frequency meters, amplitude meters, and the like.

While the invention has been illustrated and described as embodied in a scanning system for use with musical instruments, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A system for scanning mechanical vibrations of an object comprising a source of radiation arranged for transmitting a radiation beam against one side of said object, the cross-section of said radiation beam exceeding the cross-section of said object; radiation collecting means including a lens having a radiation receiving surface arranged in the path of propagation of said beam at the opposite side of said object so as to receive a portion of said beam delimited by a shadow cast by said object; said receiving surface having a peripheral contour which converges in the direction of propagation of said shadow so that the irradiated portion of said receiving surface bounded by said contour and the moving shadow changes in size proportionally to the amplitude of vibrations; and said radiation collecting means further including means for converting the changes of said irradiated portion into corresponding electrical signals.

2. A scanning system as defined in claim 1, wherein said converting means includes a radiation receiving surface of a circular configuration.

3. A scanning system as defined in claim 1, wherein the transverse cross section of the radiation beam is circular.

4. A scanning system as defined in claim 1, wherein said collecting means include a converging lens arranged in the plane of propagation of the radiation beam for focussing the shaded off light pattern behind the vibrating objects on a light receiving area of smaller diameter of the converting means.

5. A scanning system as defined in claim 1, wherein said converting means is coupled to the radiation collecting means via a radiation conductor, in the form of a flexible light conducting fiber.

6. A scanning system as defined in claim 1, further comprising means for transforming the converted electrical signal into an acoustic signal.

7. A scanning system as defined in claim 6, wherein the transforming means includes an amplifier and an acoustic transformer.

8. A scanning system as defined in claim 7, wherein the acoustic transformer includes at least one loudspeaker.

9. A scanning system as defined in claim 8, wherein the vibrating objects is a set of strings, arranged in a plane and the radiation beam is directed in said plane towards said collecting means.

10. A scanning system as defined in claim 9, wherein the source of radiation is a light source.

11. A scanning system as defined in claim 10 wherein said light source is an incadescent lamp.

12. A system for scanning mechanical vibrations of a plurality of objects arranged one after the other in a plane, comprising a source of radiation arranged for transmitting a radiation beam in said plane against one side of said objects the cross-section of said radiation beam exceeding the cross-section of respective objects; radiation collecting means including a radiation receiving surface arranged in the path of propagation of said beam at the opposite side of said objects so that umbras behind these objects are combined with each other and projected on said collecting surface; and said radiation collecting means including means for converting changes of irradiation of said receiving surface into corresponding electrical signals.

13. A system for scanning mechanical vibrations of a plurality of strings arranged side by side in a plane, comprising a source of radiation arranged in said plane for transmitting a radiation beam against one side of said strings, the cross-section of said radiation beam exceeding the cross-sections of respective strings so that umbras behind these strings are combined with each other and projected on a common radiation collecting means, said radiation collecting means including a radiation receiving surface arranged in the path of propagation of said beam at the opposite side of said strings so as to receive a portion of said beam delimited by the combined unbras cast by said strings; said receiving surface having a peripheral contour which converges in the direction of movement of said combined umbras so that the irradiated portion of said receiving surface bounded by said contour and the moving combined umbras changes in size proportionally to the amplitude of vibrations; and said radiation collecting means further including means for converting the changes of said irradiated portion into corresponding electrical signals.

14. A scanning system as defined in claim 13, wherein the collecting means includes a dispersing lens arranged between the vibrating mass and the converting means to disperse the shaded off radiation from the radiation beam on a larger light receiving area of the converting means.

15. A system for scanning mechanical vibrations of a set of strings arranged in a plane, comprising a source of radiation arranged in said plane for transmitting a radiation beam against one side of said set of strings, the cross-section of said radiation beam exceeding the cross-section of said set; radiation collecting means including a radiation receiving surface arranged in the path of propagation of said beam at the opposite side of said set so as to receive a portion of said beam delimited by a shadow cast by said set of strings, said receiving surface having a peripheral contour which converges in the direction of propagation of said shadow so that the irradiated portion of said receiving surface bounded by said contour and the moving shadow changes in size proportionally to the amplitude of vibrations; said radiation collecting means including means for converting the changes of said irradiated portion into corresponding electrical signals; means for transforming the converted electrical signals into accustic signals; the transforming means including an amplifier and at least one loudspeaker, and said source of radiation being a light source connected to an adjusting device for adjusting the position of the emitted light beam in the plane of said set of strings.

16. A scanning system as defined in claim 15, further comprising means for covering the light source, the transmitted light beam and the collecting means against ambient light.

17. A scanning system as defined in claim 16, wherein said covering means have a substantially U-shaped configuration and being provided with openings for the strings.

* * * * *